July 9, 1935.  E. L. WALL  2,007,232
AUTOMATIC CARRIAGE CONTROL FOR DUPLICATING MACHINES
Filed Nov. 2, 1932  2 Sheets-Sheet 1
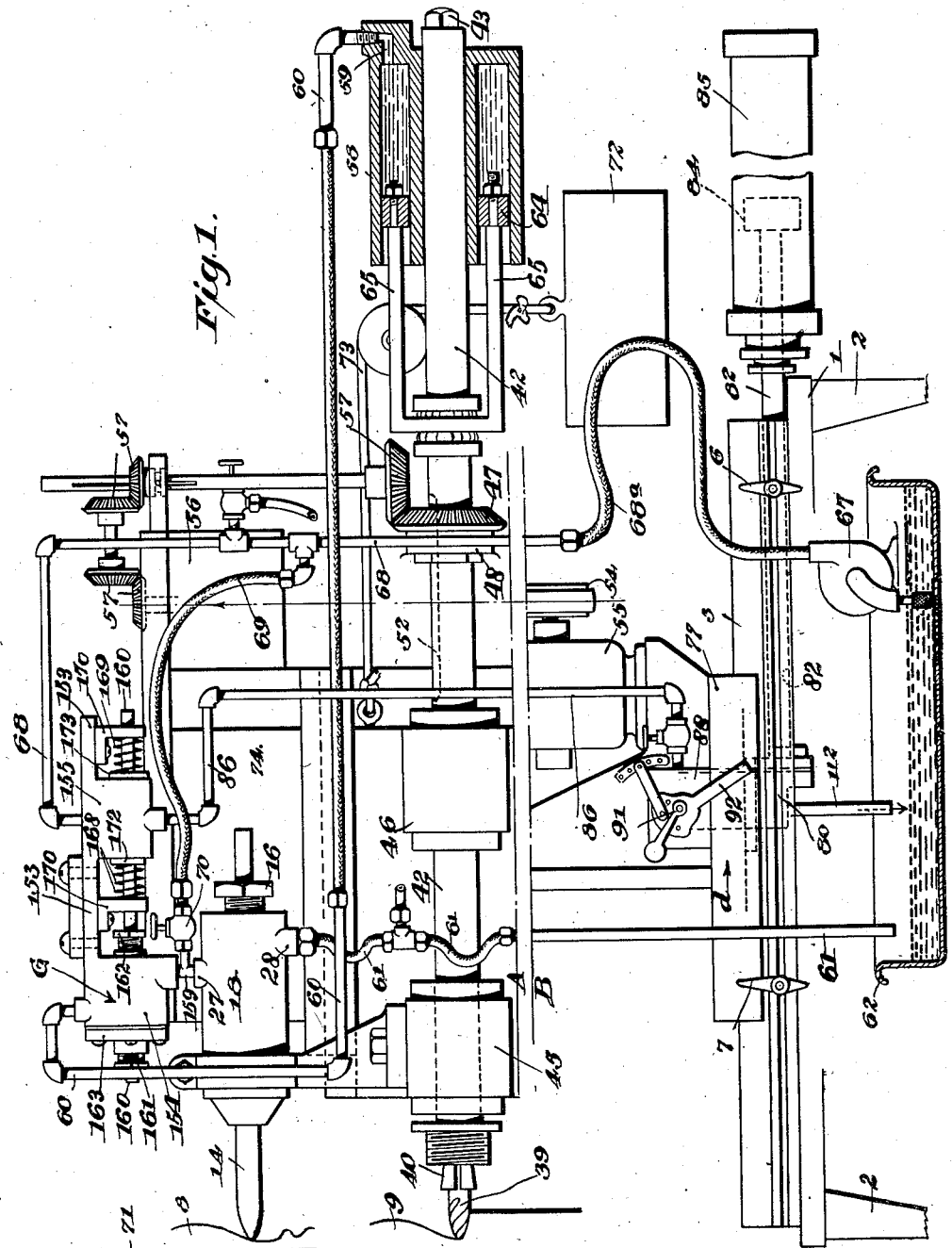
WITNESSES
INVENTOR
E. L. Wall,
BY
ATTORNEY July 9, 1935.  E. L. WALL  2,007,232
AUTOMATIC CARRIAGE CONTROL FOR DUPLICATING MACHINES
Filed Nov. 2, 1932  2 Sheets-Sheet 2
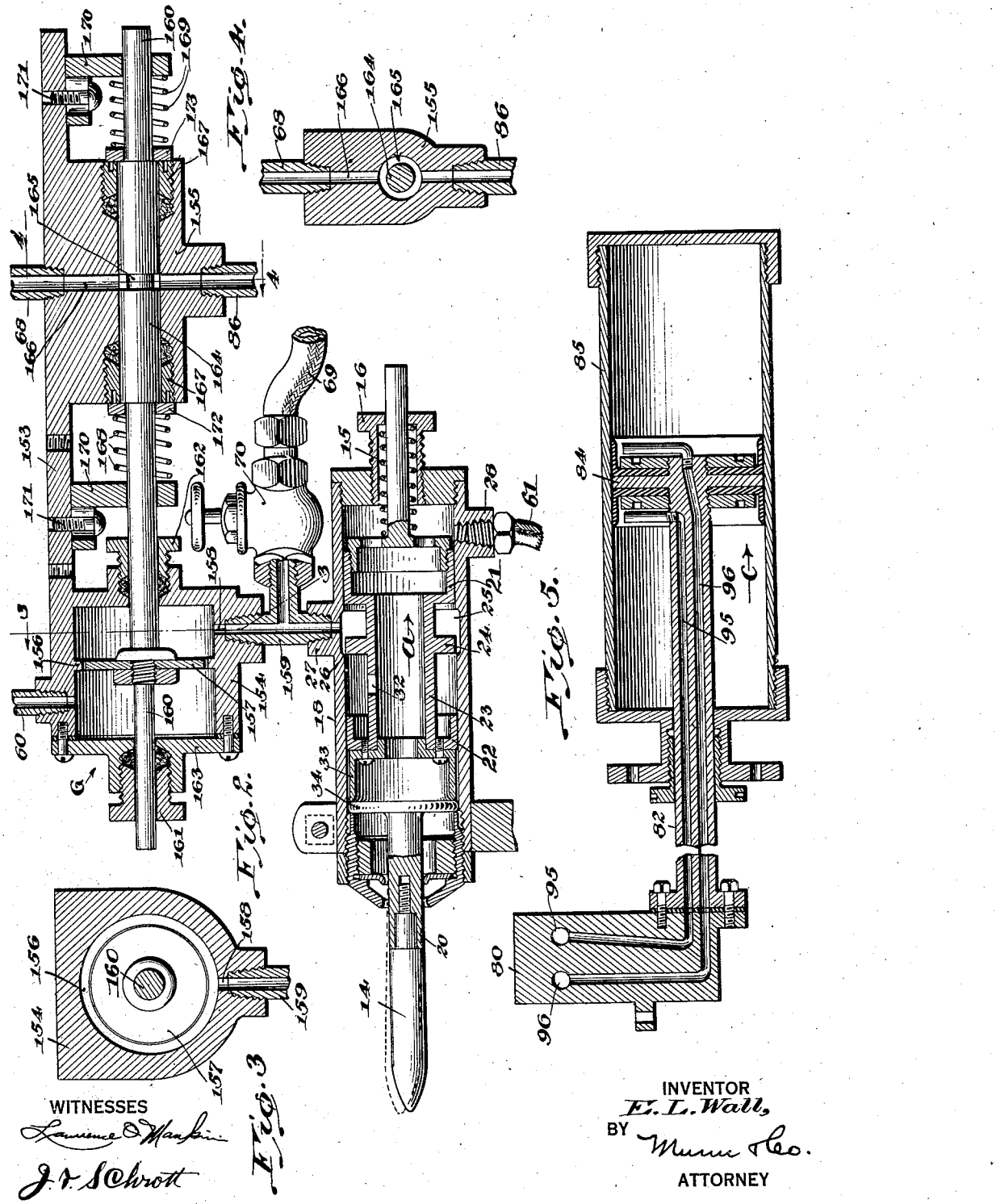
WITNESSES
INVENTOR
E. L. Wall,
BY
ATTORNEY Patented July 9, 1935

2,007,232

UNITED STATES PATENT OFFICE 2,007,232

AUTOMATIC CARRIAGE CONTROL FOR DUPLICATING MACHINES

Edmund Leo Wall, Detroit, Mich., assignor, by mesne assignments, to R. W. Glasner, Chicago, Ill.

Application November 2, 1932, Serial No. 640,887

6 Claims. (Cl. 90—13.5)

This invention relates to improvements in duplicating or milling machines, more particularly to improvements in the control of the carriage on which the tracing, cutting and other mechanism is mounted, and its objects are as follows:—

First, to cause the so-called tool carriage to move across the work at either a substantially uniform rate or at a variable rate or at combinations of said rates, in other words, at a pace harmonizing with a given profile of the pattern or master so that when the tracer either drops into a cavity or rides upon an eminence the carriage will be slowed and even stopped, and that when the tracer traverses a substantially uniform profile as to high and low places the carriage will proceed at a substantially uniform rate, but to allow the cutter ample time in which to cut into the work and make a perfect reproduction.

Second, to employ the tracer mechanism as the means for controlling the longitudinal movements of the tool carriage along the work as well as the transverse movements of the cutter into and out of the work.

Third, to combine a governor valve device with the tracer of a hydraulically operated milling mechanism, said device being automatically operative by the volume of fluid which said mechanism permits the passage of.

Fourth, to provide a governor valve device which is responsive to a fluid flow in either direction in the pressure line, thereby to throttle the flow of fluid to the so-called driver cylinder when the tracer either drops into a cavity or surmounts an eminence, thereby either slowing or stopping the tool carriage.

Fifth, to couple the tracer mechanism and governor valve device in series in the pressure line, the respective structures being such that when there is an excess passage of fluid through the governor device, said device will operate to cut down the flow to the driver cylinder and slow the tool carriage, and when the passage of fluid through said device diminishes it will increase the flow to the driver cylinder and speed up the tool carriage.

Other objects and advantages will appear in the following description, reference being had to the accompanying drawings in which Figure 1 is a diagrammatic view of the tracer and cutter mechanism which is mounted on a carriage, the view being divided on the lines A, B so as to avoid confusion by the diverse movements involved, the tracer and cutter mechanism above the line A being movable in and out with respect to the pattern and work or, in other words, transversely of the machine, the carriage below the line B being movable longitudinally of the machine or, in other words, back and forth in front of the work.

Figure 2 is a longitudinal section of the governor valve device, constituting the present invention, and the tracer cylinder with which it immediately cooperates.

Figure 3 is a cross section taken on the line 3—3 of Figure 2, particularly illustrating the medial annulus and disc valve.

Figure 4 is a cross section taken on the line 4—4 of Figure 2 illustrating another valve.

Figure 5 is a sectional view of the driver cylinder and its related driver piston.

The fundamental purpose of the invention is to automatically control the movement of a tool carriage in a duplicating machine during the act of reproducing a pattern, the control working in such a way that the carriage will not necessarily move back and forth with a uniform motion or at a uniform rate of speed, but rather will adapt itself in terms of motion, so to speak, to the particular profile of the pattern being traversed at the time by the tracer. The effect of the control is to slow, stop, speed up and diminish the speed of the carriage to suit the foregoing profile so that the cutter will have ample time in which to perform its cutting operation and will not turn out an imperfect reproduction by virtue of being forced to travel with the tool carriage at a uniform rate of speed.

It will be apparent that when the tracer drops into a cavity or reaches a virtually perpendicular wall of an eminence which it must surmount, there must be time for the cutter to reproduce the respective cavity and eminence in the work, and it will take more time to make these reproductions than would be required in reproducing relatively small low and high places. The governor valve device is therefore made to work automatically on the tool carriage so that the movements of the latter will correspond with the requirements of the cutter.

While the governor valve device is applicable to pressure fluid operated duplicating machines in general, it is particularly adapted to the duplicating machine of Edmund L. Wall, disclosed in an application filed February 26, 1931, Serial No. 518,528. The instant drawings are based on the drawings in that application, but only such parts of the structure are shown herein as are directly concerned with the invention. In other words, only enough of the structure of the co-pending application is herein shown in combination with the governor valve device to make the operative assemblage.

In order that the principle of the co-pending application may be understood, attention is directed to the following description:—The foundation of the machine comprises a stationary table 1 (Fig. 1) which is supported above the floor by legs 2. The table fixedly carries a rail structure 3. Right and left stops 6, 7 are associated with the table 1.

These stops are adjustable in accordance with the length of a pattern or master 8 which is intended to be traced for reproduction in the work 9. The pattern 8 is to be regarded as a relatively soft material such as plaster of Paris, while the work 9 may be regarded as of a relatively hard substance such as metal. The pattern 8 and work 9 are stationary along the table 1. In fact they may be supported on the table by means not shown.

The manner in which the pattern 8 (Fig. 1) is traced is as follows:—A tracer 14 (Figs. 1 and 2) is made to bear at its point on the surface of the pattern by a spring 15 which is adjustable by means of a barrel 16 with respect to a cylinder 18 so as to press on the assemblage ahead of it in the cylinder with varying degrees of pressure and thereby cause the tracer 14 to bear on the pattern 8 correspondingly.

Considerable radial motion will occur in the tracer 14 and in a shank 20 by which the tracer is carried. The radial motions as well as a rectilinear inward motion of the tracer 14 will be transmitted to a sleeve 23 which carries a circular valve plate 24. The sleeve includes piston components 21, 22. This plate occupies a chamber 25, and it is against one edge 26 of this chamber that the valve plate 24 seats under the influence of the spring 15 to cut off the flow of pressure fluid through the cylinder 18. The edge 26 is, therefore, a valve seat.

An inlet 27 communicates with the chamber 25. Pressure fluid is introduced into the cylinder 18 between the piston components 21, 22 upon the least unseating of the valve plate 24. Such unseating will occur during the foregoing movements of the tracer 14 as the latter traverses a given profile of the work 8. A fluid outlet 28 communicates with the cylinder 18 on the right side of the piston component 21. The sleeve 23 has an opening 32, and it is through this opening that a passageway for the fluid is completed between the inlet 27 and outlet 28 when the sleeve 23 is shifted by the motions of the tracer 14, these motions being imparted to the rim of a cup 33 on the cylinder, against which rim a disc 34 on the inner end of the shank 20 has bearing.

In tracing the pattern 8 the tracer 14 is as likely to suddenly encounter a high place as it is to drop into a cavity. In the first instance the tracer 14 may either rock or partake of a bodily inward movement, either resulting in a movement of the sleeve 23 toward the right as indicated by arrow a. The unseating of the valve plate 24 permits a flow of pressure fluid as previously stated. Upon encountering a cavity the tracer 14 will drop in, being compelled to do so as later brought out.

The manner in which the cutter is made to keep pace with the tracer 14 is as follows:—The cutter 39 (Fig. 1) may be regarded as of any type suitable to remove material from the work 9. The jaws of a chuck 40 are operated by a draw bar (not shown) which extends along a hollow spindle 42 at the free end of which there is a head 43. This head is on the draw bar, and by turning the head the draw bar is operated to open and close the chuck.

Bearings 45, 46 (Fig. 1) support the spindle 42 which is revolved therein by a bevel gear 47. This gear is swivelly supported by a third bearing 48. A longitudinal keyway 52 in the spindle 42 receives a key (not shown) in the hub of the gear 47. The gear 47 remains relatively sationary, and it revolves the spindle 42 as the spindle is shifted back and forth.

The gear 47 is driven from the pulley 54 of a motor 55 by means of a belt connection which transmits the power to a speed reducer 56. This reducer drives gear and shaft connections commonly designated 57, it being noted in Figure 1 that the last gear 57 of the series drives the bevel gear 47.

A cylinder 58 (Fig. 1) has a single fluid opening 59 with which one end of a conduit 60 is connected. This conduit is part of a pressure fluid system, and pressure fluid is adapted to flow into it in either direction, either into the cylinder 58 or out of it. The other end of the conduit is connected with a governor valve device G which is the principal subject of this application. The fluid system will presently be traced through the governor device as it has been through the cylinder 18, the outlet 28 of the latter having a pipe connection 61 with a sump 62 of any description. The pipe 61 is one of the exhaust pipes for the pressure fluid system. The sump 62 is usually stationary, and the exhaust pipe simply travels over the sump.

The cylinder 58 is identified as the cutter cylinder by virtue of its association with the cutter 39. It has a piston 64 which reciprocates the spindle 42 by means of a yoke 65. Fluid under pressure introduced into the cutter cylinder 58 keeps the cutter 39 against the work 9. A diminution of the fluid pressure relaxes the pressure of the cutter 39 so that the latter may recede from the work.

Pressure in the fluid system is derived from a pump 67 which recirculates the fluid in the sump 62. The pump discharges into a main pipe stand 68. In the event the pump 67 is stationarily mounted with respect to the sump 62, the pipe stand will include a flexible section 68ᵃ. A branch 69 of the pipe 68 supplies the cylinder 18 and governor device G with pressure fluid. A valve 70 in this branch, enables the regulation of the pump pressure in the conduit 60 and consequently in both cylinders 18 and 58. Pressure fluid may flow either through the governor G into the pipe 60 and so into the cutter cylinder 58 to drive the piston 64 to the left and keep the cutter 39 held against the work, or it may flow through the cylinder 18 into the discharge pipe 61 thus relaxing the pressure in the pipe 60 and cylinder 58, permitting the cutter 39 to recede from the work.

The lowest normal plane which the tracer 14 is supposed to reach is denoted 71 (Fig. 1). Recession of the tracer from this plane or from any low place which it may occupy occurs indirectly by means of a weight 72. This weight is permitted to function only when a movement of the tracer 14 causes an opening of the valve plate 24 (Fig. 2) and a consequent pressure drop in the conduit 60. The weight 72 has a cable connection 73 with a slide plate 74. This plate carries the bearings 45, 46 and provides the support for the cylinder 18 and governor device G so that all of these parts move as one with the slide plate 74.

A longitudinally movable carriage 77, usually longitudinally slidable, carries the slide plate 74. The carriage 77 moves longitudinally on the rail structure 3 in front of the pattern 8 and work 9. The plate 74 slides transversely of the carriage 77 so that the tracer 14 and cutter 39 move in and out with respect to the pattern 8 and work 9.

The manner in which the carriage 77 is made to work back and forth is as follows:—The carriage includes a head 80 (Figs. 1 and 5) which is a part of it. This head has an attached rod 82 which carries a double headed piston 84 (Fig. 5). This piston is made to work back and forth in a driver cylinder 85. This cylinder is fixed on the table 1, and as the piston 84 is made to work back and forth the carriage 77 and all of its superimposed parts are made to traverse the rail structure 3 longitudinally in front of the pattern 8 and work 9.

A branch pipe 86 delivers fluid at pump pressure for the operation of the piston 84. This branch pipe is controlled by the governor G. The pressure fluid of the branch pipe is delivered to a trip valve the details of which are omitted. It is sufficient to say that this trip valve is contained by a casing 88 forming part of the carriage 77. The stem 91 of the trip valve loosely carries a tripper 92. This tripper is engageable with the stops 6, 7 (Fig. 1) when the carriage 77 nears the end of its movements, thus turning the trip valve to new positions and causing the automatic reversal of the carriage 77.

This trip valve controls right and left passages 95, 96 in the head 80 (Fig. 5) so that when the valve is in one position pressure fluid will flow into one of the passages and out of the other passage. These passages terminate at opposite sides of the double headed piston 84 and consequently with opposite ends of the driver cylinder 85. The present setting of the trip valve affords communication of the branch pipe 86 with the passage 95 so that pressure fluid is admitted to the left end of the cylinder 85. Pressure at the left side of the piston 84 drives this to the right (arrow c, Fig. 5), consequently moving the carriage 77 to the right (arrow d, Fig. 1). The same setting of the trip valve permits an exhaust of fluid from the right end of cylinder 85 through the passage 96 to a second exhaust pipe 112. This pipe discharges into the sump 62.

In actual practice provision is made for spacing the tracer 14 and cutter 39 in the vertical direction at the end of each right and left movement of the carriage 77. Usually this spacing is in the downward direction. The mechanism for accomplishing this spacing is fully disclosed in the co-pending application but is omitted here because it has no bearing on the present invention which comprises the governor valve device G. A base 153 (Fig. 2) carries structure forming fluid chambers 154, 155. The first of these has a medial annulus 156 which provides a loose seat for a valve 157 in this respect:—The valve 157 consists of a disc which is movable through the annulus 156 from its neutral position within the annulus, this movement necessitating a clearance of several thousandths of an inch between the confronting faces of the annulus and disc.

The pressure conduit 60 communicates with the chamber 154 at the left of the annulus 156. An aperture 158 at the right of the annulus has communication with the inlet 27 of the cylinder 18 by means of a three-way nipple 159. It is to the third branch of this nipple that the valve 70 is connected, it being remembered that it is through this valve that fluid at pump pressure is received by way of the branch 69.

A stem 160 carries the valve 157. The portions of the stem adjacent to the valve are supported and guided by glands 161, 162. The gland 161 is carried by a cover plate 163 providing one end closure for the chamber 154.

An enlargement 164 of the stem 160 has an annular groove 165 providing a valve in the fluid chamber 155. The enlargement 164 is slidable in the chamber 155 and its valve 165 controls a port 166 with the opposite ends of which the respective main pipe stand 68 and branch pipe 86 are connected. Glands 167 keep packings at the ends of the chamber 155 under pressure so as to prevent leakage around the enlargement 164.

Springs 168, 169 act on the stem 160 to maintain the neutral position of the valves 157, 165. The outer ends of these springs engage abutments 170 which are adjustably mounted at 171 on the base 153. The inner ends of the springs engage washers 172, 173 which abut the shouldered ends of the enlargement 164. The enlargement is as long as the chamber 155, and presuming the springs 168, 169 to be equalized their effect is to center the enlargement 164 in the chamber 155 and consequently station the valve 157 within the annulus 156.

The operation is readily understood. In considering diagrammatic Figure 1 it must be remembered that the structure above the line A works at right angles to the structure below the line B. The carriage 77 moves back and forth on the track structure 3 in front of the pattern 8 and work 9 which are supposed to be lying in the plane of the paper. The tracer 14 and cutter 39 would then be working into the paper, so to speak, but rather than to disclose the parts in correct relationship, which would mean an unsatisfactory showing, the mode of illustration in Figure 1 has been adopted, relying on the reader's understanding that the two parts work at angles to each other.

As long as the pump 67 is in operation there is positive pressure in the flexible section 68ª, pipe stand 68 and its branch 69. Consider the governor device G as in its neutral position (Fig. 2). Fluid at pump pressure will flow from the pipe stand 68 with undiminished force through the port 166 (Fig. 2) and from there through the branch pipe 86 down to the trip valve in the casing 88. The trip valve is now directing the pressure fluid into the left end of the driver cylinder 85 by way of the passage 95, the fluid in the right end of the cylinder exhausting through the passage 96 and exhaust pipe 112 into the sump 62. As long as pressure fluid is being supplied to the driver cylinder 85 the carriage 77 will be moving back and forth, its reversal occurring by means of the tripper 92 and stops 6, 7 as previously pointed out. As long as the valve 165 of the governor G (Fig. 2) remains in the mid or neutral position with respect to the port 166 the carriage 77 will be propelled back and forth at a uniform rate.

Still considering the same neutral position of the governor valve device G (Fig. 2) fluid at pump pressure will be present in the cutter cylinder 58 (Fig. 1) by virtue of a very slight passage of fluid from the branch 69 (Fig. 1) into the right end of the fluid chamber 154, through the space between 156 and 157 and into the conduit 60. This passage of fluid is only sufficient to cause a very slight movement of the piston 64 (Fig. 1) to the left, but the pressure is sufficient to keep the cutter 39 up to its work. The annular space between 156 and 157 (Fig. 2) enables this passage of fluid without hindering the action of the springs 168, 169, these then so positioning the stem 160 that neutralization is established both as to the valve disc 167 and the valve 165.

At this particular time the large volume of the pump output goes through the port 166 (Fig. 2) past the valve 165, the latter being in the wide open or neutral position as stated above. A relatively small volume of the fluid goes through the space between 156 and 157. The resistance at this point is consequently low, and the springs 168, 169 are able to neutralize the valve assemblage.

As long as the tracer 14 traverses relatively small low and high places along a particular line of profile of the pattern 8 the tracer 14 and cutter 39 will simply fall and rise without any great change in the motion of the carriage 77 (Fig. 1). Imagine the tracer as traversing a surface such as just described, or a surface which is substantially flat and straight. Under this condition there is no need of increasing or decreasing the amount of fluid in the cylinder 58 (Fig. 1). The tracer valve or circular valve plate 24 (Fig. 2) will be spaced a short distance from its seat 26 as it must be in order to provide an outlet for the relatively low but constant volume of fluid delivered from the branch 69 and valve 70.

In the event the tracer 14 reaches a slight concavity it will follow the surface of the concavity by virtue of the constant pump pressure behind the piston 64 (Fig. 1) and the cutter 39 will cut a corresponding concavity for the same reason. It is true that the pressure in the cutter cylinder 58 is expended directly on the cutter 39, but inasmuch as the tracer 14 is carried by the slide 74 in common with the hangings of the cutter it follows that the tracer and cutter will partake of virtually simultaneous in and out movements.

In the event of the tracer 14 riding upon a high place, the momentary backward displacement of the tracer, whether that be directly inward with respect to the cylinder 18 (Fig. 2) or merely a rocking motion, will shift the sleeve 23 to the right (arrow a) and open the valve 24 to a greater extent than it was before. Thus a wider opening of the valve 24 lets more of the fluid through into the exhaust pipe 61 (Fig. 1). There is a diminution of the pressure in the conduit 60 because of the diversion of more of the fluid from the right end of the chamber 154 (Fig. 2).

The foregoing diminution in pressure in the line 60 is felt in the cutter cylinder 58. The weight 72 pulls back on the slide plate 74 until the piston 64 is resisted, the permissible amount of pulling back agreeing with the high place which the tracer 14 has ridden. The higher place will be reproduced in the work by the cutter 39.

So far the operation is practically identical with the operation of the mechanism in the co-pending application. The specific arrangement (the governor valve device G) takes care of instances where the pattern 8 has very pronounced cavities and eminences which take more time to traverse than ordinary low and high places, consequently making it necessary to slow the carriage 77 in order that the cutter 39 may have time to conformably shape the work.

Consider the tracer 14 as having reached a deep concavity. The condition will be as though the tracer were about to drop into a hole, so to speak. The tracer should drop into the hole but the carriage 77 must be slowed in order to give the tracer time to drop into the hole and, what is more important, give the cutter 39 time to reproduce the hole in the work 9.

Since there is now a hole in front of the tracer 14 the tracer ceases to bear hard on the pattern. The valve 24 (Fig. 2) closes on its seat 26. Instead of the fluid being diverted from the chamber 154 through the cylinder 18 (Fig. 1) to the sump 62 as it was before, all of the fluid in the branch 69 goes into the chamber 154.

A pressure higher than usual is imposed on the right side of the valve disc 157. The space between 156 and 157 is insufficient for the escape of the heavier volume of fluid. As a result the valve 157 is forced to the left so as to let the surplus through into the conduit 60 and into the right end of the cutter cylinder 58 (Fig. 1). The cutter 39 is driven into the work with added force. At the same time the leftward movement of the valve 157 and its carried assemblage throttles the port 166 by virtue of the valve 165 moving leftward. The amount of fluid delivered to the casing 88 (Fig. 1) is cut down. This slows the carriage 77 while the cutter 39 is made to work harder.

The effect of the foregoing operation is to cause the cutter 39 to cut deeper into the work. When the tracer 14 reaches the bottom of the hole it will bear on the bottom and cause an outward displacement of the valve 24 (Fig. 2). This again diverts the fluid from the chamber 154. The former condition is restored, namely the neutralization of the valve 157 and its carried parts. The tracer 14 and cutter 39 will progress in the new position until the next change in the pattern occurs.

Suppose this change to be a very high place; an up going wall as steep as the down going wall was supposed to be. Both the tracer and cutter will need time to negotiate this wall, and the carrier 77 must again be slowed to provide time. The first effect will be a lateral motion of the tracer 14. This opens the valve 24 (Fig. 2). There will be a discharge of fluid through the tracer cylinder 18 into the discharge pipe 61 and a drop in pressure in the pipe 60 so that the weight 72 is enabled to pull the slide 74 toward the right (Fig. 1). This is only the first effect; the main effect will be a surmounting of the eminence by the tracer. There will be a considerable inward displacement of the tracer and an opening wide of the valve 24 so that there will be a heavy discharge of fluid at pump pressure through the tracer cylinder 18 to the discharge pipe 61, and a consequently heavy discharge of fluid from the cutter cylinder 58 to the conduit 60 because of the action of the weight 72.

This heavy discharge from the conduit 60 now occurring from left to right in the chamber 154 (Fig. 2) will displace the valve 157 to the right of the annulus 156, letting the fluid through, and at the same time displacing the valve 165, either partially or wholly closing the port 166. A partial closure of this port will diminish the supply of fluid to the driver cylinder 85 with a consequent slowing of the carriage 77 as before, while a total closure will cut off the supply entirely with a consequent stopping of the carriage 77.

As soon as the tracer 14 surmounts either a high place or reaches the level of a low place the normal condition of the machine will be restored. The governor valve device G will resume its neutral position, and that position will be maintained until there is again a sudden passage of fluid through the chamber 154 in either direction. It is always the passage of an excess of fluid in either direction which displaces the valve 157 and causes a partial or total closure of the valve 165.

It will be understood that the neutral position of the valve 167 is maintained by the springs 168, 169. A movement of the stem 160 toward the left will place the spring 168 under tension, while a movement toward the right will place the spring 169 under tension. When the condition causing the displacement is removed, either spring will act on the enlargement 164 to return the valve assemblage to the place where it started from.

I claim:—

1. In a milling machine, a movable carriage and a movable cutter carried by said carriage, a master fixedly supported with respect to said carriage, a pressure fluid system including actuating means which is actuated by force of the pressure to move the carriage along the master, by-pass means in a portion of said system, said by-pass means being operable by a relatively heavy surge of fluid therein, and a valve controlling another portion of said system, said valve being moved by the operation of said by-pass means to throttle the flow in said other portion of the system, and thereby the volume delivered to said actuating means.

2. In a milling machine, a movable carriage and a movable cutter carried by said carriage, a master fixedly supported with respect to said carriage, a pressure fluid system including actuating means which is actuated by force of the pressure to move the carriage along the master, a tracer to follow the contour of said master, said tracer being movable by virtue of its encountering unevenness in the contour of the master, by-pass means in a portion of said system being operable by an abnormally heavy surge of fluid in said portion when the tracer encounters an abrupt formation in said contour, and a valve device in another portion of said system directly supplying said actuating means, said valve device being moved by operation of said by-pass means to throttle the flow to said actuating means and thereby vary the rate of movement of said carriage.

3. In a milling machine, a fixedly supported master, a movable carriage and a driver cylinder having a piston to move the carriage along the master, a movable cutter carried by the carriage and a cutter cylinder having a piston for keeping the cutter up to its work, a pressure fluid system supplying both cylinders to expend pressure against the respective pistons, a tracer to follow the master, being movable by the unevenness thereof, a valve device in a part of said system subject to minor openings by the tracer for a minor exhaust of fluid from said cutter cylinder and a relaxation of the pressure against its piston, by-pass means in the adjacent portion of said system operating by a relatively heavy surge of fluid by a large opening of said valve device when the tracer encounters an abrupt high place in the master, and a valve in another portion of said system, being moved by the operation of said by-pass means to throttle the passage of fluid to the driver cylinder and thereby reduce the rate of movement of the carriage.

4. In a milling machine, a movable carriage and actuating means for moving the carriage with respect to a fixed master, a movable work cutter carried by the carriage, means tending to pull the cutter away from the work, pressure fluid apparatus resisting said means and tending to pull the cutter toward the work, said apparatus including a pressure fluid system embracing said actuating means, a tracer coupled with the cutter having vibratory motion in reference to the cutter, a valve in said system being subject to the vibrations of the tracer to increase and decrease the effectiveness of said apparatus, hence decrease and increase the effectiveness of the pusher means, by-pass means producing a consonantly large opening in said system by a large opening of the valve when the tracer encounters an abnormally high place, and a valve in that portion of the system supplying the actuating means, being operated by the by-pass means to throttle the flow to said actuating means and correspondingly slow the carriage.

5. In a milling machine, a governor for controlling the movable tool carriage thereof, said governor comprising two fluid chambers, a pressure fluid system having branches embracing each of the chambers, a valve in one of the chambers being disposed across the inlet and outlet of the respective branch and thereby subject to movement upon a surge of fluid in said branch through the respective chamber, a valve in the other chamber, and means connecting the valves so that said movement will throttle the fluid flow in said other chamber.

6. In a milling machine, a governor for controlling the movable tool carriage thereof, said governor comprising two fluid chambers, a pressure fluid system for actuating the carriage, including branches each of which has an inlet and an outlet at the respective chambers, an annulus in one of the chambers situated medially of the inlet and outlet, a valve disc peripherally spaced from the internal circumference of said annulus, a stem carrying said valve disc, said stem having a valve controlling the inlet and outlet of the second chamber, and resilient means associated with said stem, maintaining said disc in centralized position with respect to the annulus and said valve in a fully open position with respect to its inlet and outlet.

EDMUND LEO WALL.